United States Patent
Sudhan et al.

(10) Patent No.: US 11,545,687 B1
(45) Date of Patent: Jan. 3, 2023

(54) SYSTEMS AND METHODS OF RESTORING FUEL CELL SYSTEM PERFORMANCE

(71) Applicant: BLOOM ENERGY CORPORATION, Sunnyvale, CA (US)

(72) Inventors: Karthick Sudhan, Mumbai (IN); Amit Nawathe, Mumbai (IN); Abhishek Dudhmande, Mumbai (IN); Vijay Radhakrishnan, Mumbai (IN); Padiadpu Shankara Anantha, Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 782 days.

(21) Appl. No.: 16/162,900

(22) Filed: Oct. 17, 2018

Related U.S. Application Data

(60) Provisional application No. 62/611,726, filed on Dec. 29, 2017.

(51) Int. Cl.
| | |
|---|---|
| *H01M 8/04298* | (2016.01) |
| *H01M 8/0662* | (2016.01) |
| *H01M 8/04089* | (2016.01) |
| *H01M 8/2465* | (2016.01) |

(52) U.S. Cl.
CPC ..... *H01M 8/0675* (2013.01); *H01M 8/04089* (2013.01); *H01M 8/2465* (2013.01)

(58) Field of Classification Search
CPC ............. H01M 8/0675; H01M 8/0408; H01M 8/2465; H01M 8/00–2495; H01M 2250/00–407

USPC .................................................. 429/400–535
See application file for complete search history.

(56) References Cited

U.S. PATENT DOCUMENTS

| | | | |
|---|---|---|---|
| 3,266,937 A * | 8/1966 | Lyons, Jr. ............... | H01M 8/00 429/428 |
| 7,713,649 B2 | 5/2010 | Hickey et al. | |
| 9,190,693 B2 | 11/2015 | Sridhar et al. | |
| 10,096,840 B1 | 10/2018 | Venkataraman et al. | |
| 2003/0211372 A1* | 11/2003 | Adams ............. | H01M 8/04589 429/432 |
| 2004/0219399 A1* | 11/2004 | Zhu ................... | H01M 8/04955 429/468 |
| 2004/0224192 A1* | 11/2004 | Pearson ............ | H01M 8/04947 429/432 |
| 2005/0123809 A1* | 6/2005 | Saunders .......... | H01M 8/04238 429/432 |
| 2006/0057441 A1* | 3/2006 | Wills .................. | H01M 16/006 429/430 |
| 2006/0070886 A1* | 4/2006 | Saunders ................ | H01M 4/86 429/432 |
| 2006/0204827 A1 | 9/2006 | Hickey et al. | |
| 2007/0154743 A1* | 7/2007 | Zhang ............... | H01M 8/04238 429/432 |
| 2008/0118793 A1* | 5/2008 | Chapman .......... | H01M 8/04753 429/432 |
| 2011/0281185 A1 | 11/2011 | Sridhar et al. | |
| 2015/0140458 A1* | 5/2015 | Marsh ................. | H01M 8/0438 429/410 |

(Continued)

*Primary Examiner* — Bach T Dinh
(74) *Attorney, Agent, or Firm* — The Marbury Law Group PLLC

(57) ABSTRACT

A fuel cell system performance recovery method includes applying a DC current load pulse waveform to one or more of the fuel cells for a recovery period sufficient to desorb a contaminant from the one or more fuel cells.

22 Claims, 6 Drawing Sheets

(56) References Cited

U.S. PATENT DOCUMENTS

2015/0194685 A1* 7/2015 Ballantine ........... H01M 8/0687
  429/444
2018/0097245 A1* 4/2018 Matsusue ................ B60L 58/40

* cited by examiner

SYSTEMS AND METHODS OF RESTORING FUEL CELL SYSTEM PERFORMANCE

FIELD

Aspects of the present invention relate to methods of resorting fuel cell system performance, and in particular, to methods of rapidly desorbing contaminants from solid oxide fuel cell system anodes.

BACKGROUND

The reliability of fuel cell systems, such as a solid oxide fuel cell (SOFC) system, greatly depends on the presence and concentration of undesirable constituents in the fuel stream. Undesirable constituents, such as moisture, oxygen, siloxanes, and sulfur (including sulfur compounds), may degrade the fuel cell stack's performance and cause irreversible damage resulting in decreased efficiencies and costly replacement. Specifically, when using natural gas as a fuel, fuel cell systems require desulfurization. Passing fuel through desulfurizer sorbent beds is one way to remove sulfur and sulfur compounds from fuel prior to use in a fuel cell.

However, the sorbent beds (e.g., absorbent and/or adsorbent beds) have a finite life and once the sorbent bed is exhausted, a breakthrough event may occur where contaminants such as sulfur may pass through the sorbent bed without being adsorbed and reach the fuel cell stack, causing permanent damage and/or a reduction in fuel cell performance.

Accordingly, there is a need for systems and methods for recovering the performance of a fuel cell system after a breakthrough event.

SUMMARY

Exemplary embodiments of the present disclosure provide a performance recovery method for a fuel cell system comprising, the method comprising: detecting a sorbent bed contaminant breakthrough event during operation of the fuel cell system in a steady-state mode; operating the fuel cell system in a performance recovery mode in response to the detection of the breakthrough event, the performance recovery mode comprising applying a DC current load pulse waveform to one or more of the fuel cells for a recovery period sufficient to desorb a contaminant from the corresponding fuel cells; and operating the fuel cell system in the steady-state mode.

Exemplary embodiments of the present disclosure provide a fuel cell system comprising: power modules comprising fuel cell stacks; a sorbent bed assembly configured to remove contaminants from fuel provided to the fuel cell stacks; load controllers configured to selectively control a current load applied to the fuel cell stacks of each power module; and a controller configured to control the load controllers to apply a direct current (DC) current load pulse waveforms to the fuel cell stacks, if a breakthrough event of the sorbent bed assembly is detected, for a recovery period sufficient to desorb a contaminant from anodes of the fuel cell stacks.

In some embodiments, a performance recovery method comprises applying a DC current load pulse waveform to one or more of the fuel cells for a recovery period sufficient to desorb a contaminant from the corresponding fuel cells.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Fuel Cell Systems

Figure 1:
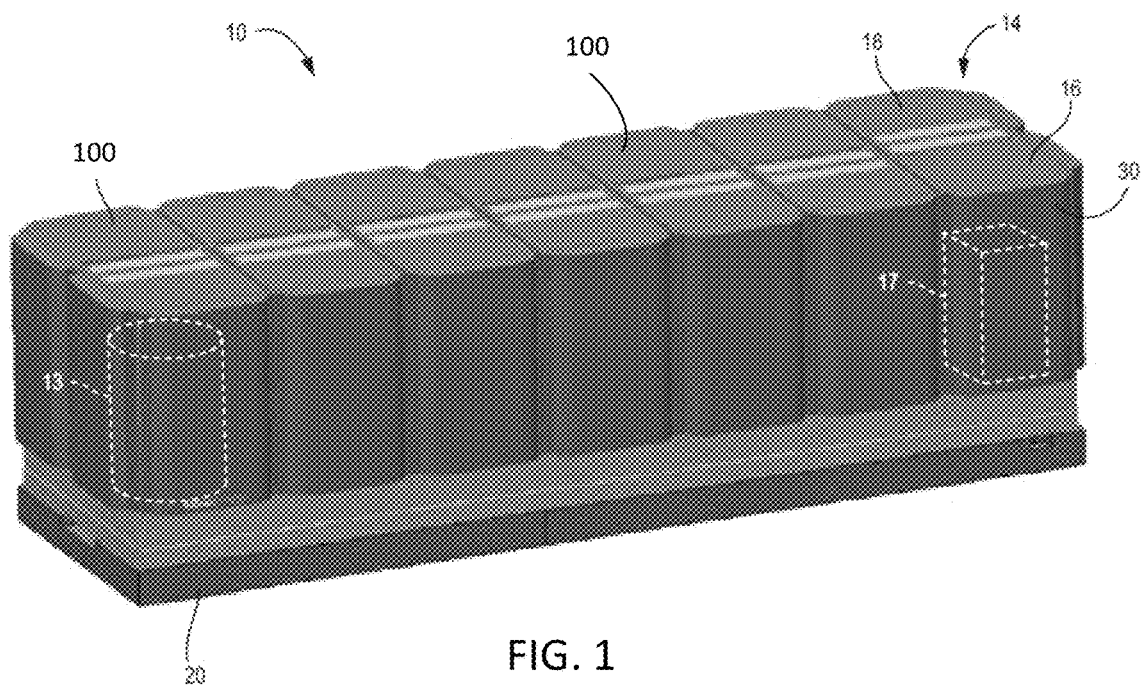
FIG. 1 is a perspective view of a fuel cell system according to various embodiments of the present disclosure.
Figure 2:
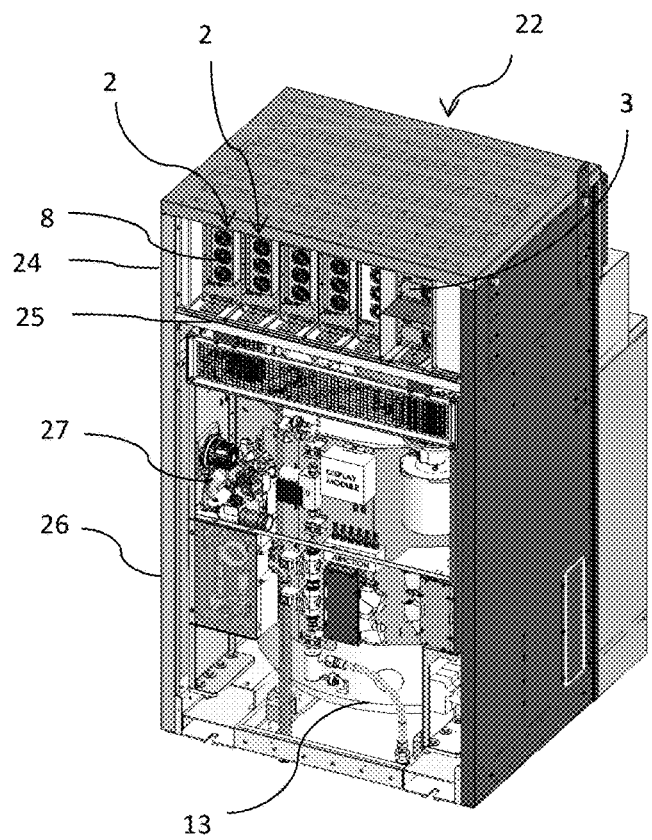
FIG. 2 is a perspective view of a power module included in the system of FIG. 1.

FIG. 1 is a perspective view of a fuel cell system 10, according to various embodiments of the present disclosure. FIG. 2 is a perspective view of a power module 100 included in the system 10 of FIG. 1.

Referring to FIGS. 1 and 2, the system 10 may contain modules and components described in U.S. patent application Ser. No. 11/656,006, filed on Jan. 22, 2007, and incorporated herein by reference in its entirety. The modular design of the enclosure of the fuel cell system 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

In various embodiments, the system 10 includes power modules 100, a fuel processing module 16, and a power conditioning module 18, which are disposed on a common base 20. The power conditioning modules 18 are configured to deliver direct current (DC). In alternative embodiments, the power conditioning modules 18 are configured to deliver alternating current (AC). In these embodiments, the power condition modules 18 include a mechanism to convert DC to AC, such as an inverter. For example, the system enclosure may include any desired number of modules, such as 2-30 power modules, for example 3-12 power modules, such as 6-12 modules.

The power modules 100 may each include a housing 22. The housing 22 may be divided into a fuel cell cabinet 26 and an electrical cabinet 24 by a platform 25. This design reduces the size of the fuel cell system module 100, allowing the fuel cell system module 100 to fit into small spaces for indoor applications, such as freight elevators and freight corridors.

The fuel cell cabinet 26 may be configured to contain one or more other fuel cell system components, such as, one or more power generation components. The one or more power generation components may include a hot box 13 containing one or more fuel cell stacks and a balance of plant (BOP) sub-system 27 including blowers, valves, and control boards, etc.

The electrical cabinet 24 may be configured to contain electronics modules 2 that may be disposed in corresponding slots provided in the electrical cabinet 24. For example, the electrical cabinet 24 may include a DC/DC voltage converter 3 electrically connected to one or more fuel cell stacks and cooling fans 8.

The fuel cells may be solid oxide fuel cells having a ceramic oxide electrolyte separated by conductive interconnect plates. Other fuel cell types, such as PEM, molten carbonate, phosphoric acid, etc. may also be used. The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processor 17 is disposed in a cabinet of the fuel processing module 16 and includes sorbent bed assemblies that include desulfurizer and/or other impurity adsorption beds. The fuel processor 17 may be accessed by a door 30 of the cabinet. The fuel processing module 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The fuel processing module 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels.

The fuel processor 17 is configured to reduce a fuel cell stack's exposure to contaminants, such as sulfur, for example. The fuel processor 17 may include components for detecting the undesirable constituent downstream from a given sorbent bed, which indicates a breakthrough event (i.e., bed exhaustion). Once a breakthrough event is detected, a reserve capacity sorbent bed may be used to prevent more undesirable constituent from reaching the fuel cell stack (i.e., power generation module). Specifically, control systems may change the operation of the fuel cell system by altering fuel flow, utilizing a reserve sorbent bed, powering portions of the fuel cell system on/off, selecting different fuel sources, etc.

Additionally, a detection system may enable detection of contaminants such as siloxanes, moisture, oxygen, sulfur (including sulfur compounds such as organo-sulfur compounds), and other fuel cell stack poisons. Sending data representative of contaminant types to a database may be used to create a contaminant map. Process controls may access the undesirable constituent type data and the undesirable constituent map to alter operations such as fuel flow, fuel source selection, and power to various portions of the fuel cell system. These alterations to the fuel cell system operation may prevent or reduce the exposure of fuel cell stack to the undesirable constituents, thereby improving efficiency and the operational life of fuel cell stack.

However, in cases where a breakthrough event occurs, the contaminants, such as sulfur species included in natural gas, may reach the fuel cell stacks. Herein, sulfur species may be addressed as specific contaminants. However, the present disclosure is not limited thereto. For example, the present disclosure may also be applied to other contaminants, such as carbon, silicon, and phosphorus species.

Sulfur species may be absorbed onto (e.g., poison) anodes of the fuel cell in the stack. In particular, it is believed that the sulfur species are absorbed onto the nickel of the anodes and restrict fuel cell reactions by limiting reformation and proton generation. As a result, the performance of the fuel cell system may be reduced.

Fuel Cell Performance Recovery Systems

Conventionally, once a new sorbent bed has been activated, the fuel cell system is operated with substantially sulfur-free fuel, and fuel cell performance may slowly improve. In particular, during operation, sulfur species may be slowly desorbed from the anodes over the course of a number of days of operation. However, during this period, the fuel cell system will run at a lower efficiency. In particular, fuel may pass through the fuel cells without being reacted, due to the poisoning of the anodes by the sulfur species.

Accordingly, the present disclosure provides a system and method for recovering fuel cell system performance in a shorter period of time, after sulfur poisoning occurs. In particular, the present inventors have discovered that intentionally varying a current load applied to fuel cells at a high frequency rapidly improves fuel cell performance, by increasing the desorption rate of sulfur species from nickel anodes.

While not wishing to be bound by any particular theory, it is thought that during peak current of the pulse the oxide ions at the three phase boundary of the anode may not have enough of the fuel (i.e., nickel or protons) to produce water or nickel oxide, which may lead to reaction of oxide ions transported through the electrolyte with adsorbed sulfur species, thereby rapidly generating $SO_2$. In the alternative, it is believed that the pulsing may result in reaching the electrochemical oxidation potential of sulfur, which may accelerate the performance recovery through faster desorption.

Figure 3:
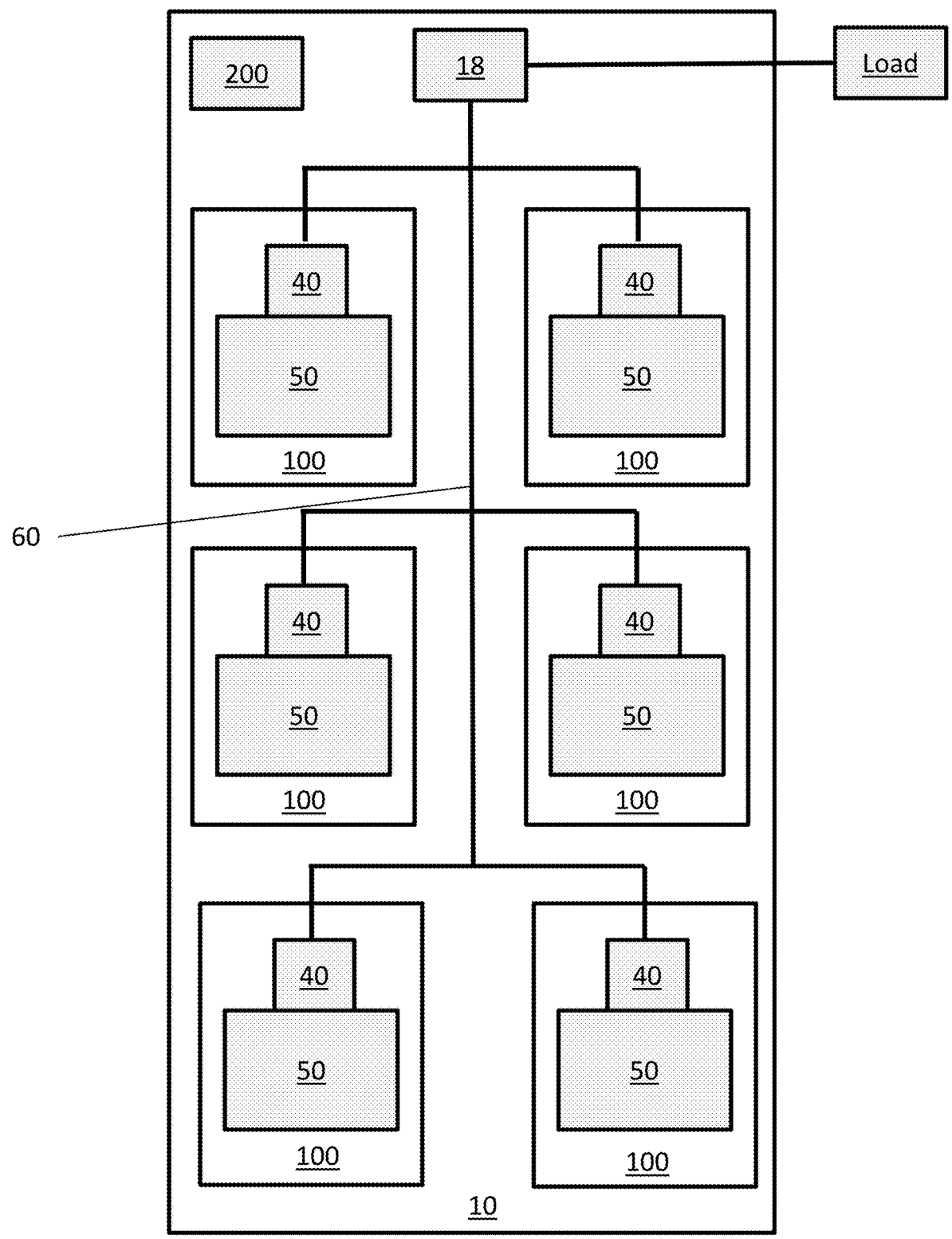
FIG. 3 is a block diagram illustrating electrical connections of the fuel cell system of FIG. 1.

FIG. 3 is a block diagram illustrating electrical connections of the fuel cell system 10 of FIG. 1. Referring to FIG. 3, each power module 100 is connected to the power conditioning module 18 by a bus line 60. In particular, fuel cell stacks 50 disposed in each power module 100 are electrically connected to a DC load regulator 40 that is electrically connected to the bus line 60. In some embodiments, the load regulator 40 may be a DC/DC converter 3 shown in FIG. 2, or the like. The power conditioning module 18 may be connected to an external load. The system 10 may also includes a controller 200 electrically connected to various elements of the system 10 as discussed below.

In FIG. 3, each power module 100 is shown to include one fuel cell stack 50. However, each power module 100 may include multiple stacks 50. In addition each stack 50 may be connected to a corresponding load regulator 40, or multiple stacks 50 in a power module 100, or multiple power modules 100, may be connected to the bus line 60 by the same load regulator 40. In some embodiments, the load regulator 40 may be a DC/DC converter 3.

The controller 200 may be configured to detect a breakthrough event. For example, the controller 200 may be connected to one of the constituent sensors described above. In other embodiments, the controller 200 may be configured to detect a breakthrough event based on a voltage drop in the power modules 100.

Once a breakthrough event is detected, the controller 200 may be configured to apply a pulsed load to the stacks 50. In particular, the controller 200 may be configured to control the load regulators 40, to rapidly pulse the current load applied to the stacks 50. The current load may be pulsed at a particular frequency, peak current (e.g., pulse amplitude), and duty cycle.

FIGS. 4A-4D are graphs respectively illustrating current load pulse waveforms 300, 302, 304, 306, according to various embodiments of the present disclosure. Referring to FIGS. 4A-4D, waveforms 300, 302, 304, 306, may include positive current pulses where a DC current load is increased from a base current to a peak current. The pulses may be separated by periods where the current load is equal to the base current.

The peaks of each waveform may have different shapes. For example, waveforms 300 and 306 include rectangular pulses, waveform 302 includes sinusoidal pulses, and waveform 304 includes triangular pulses. However, other suitable waveforms may be used.

Figure 4A:
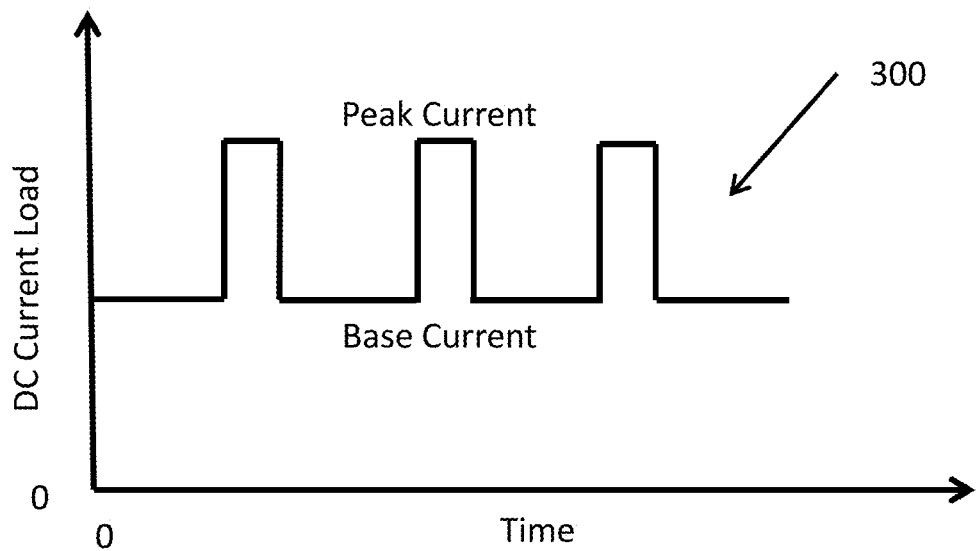
FIGS. 4A-4D are graphs illustrating current load pulse waveforms, according to various embodiments of the present disclosure.
Figure 4B:
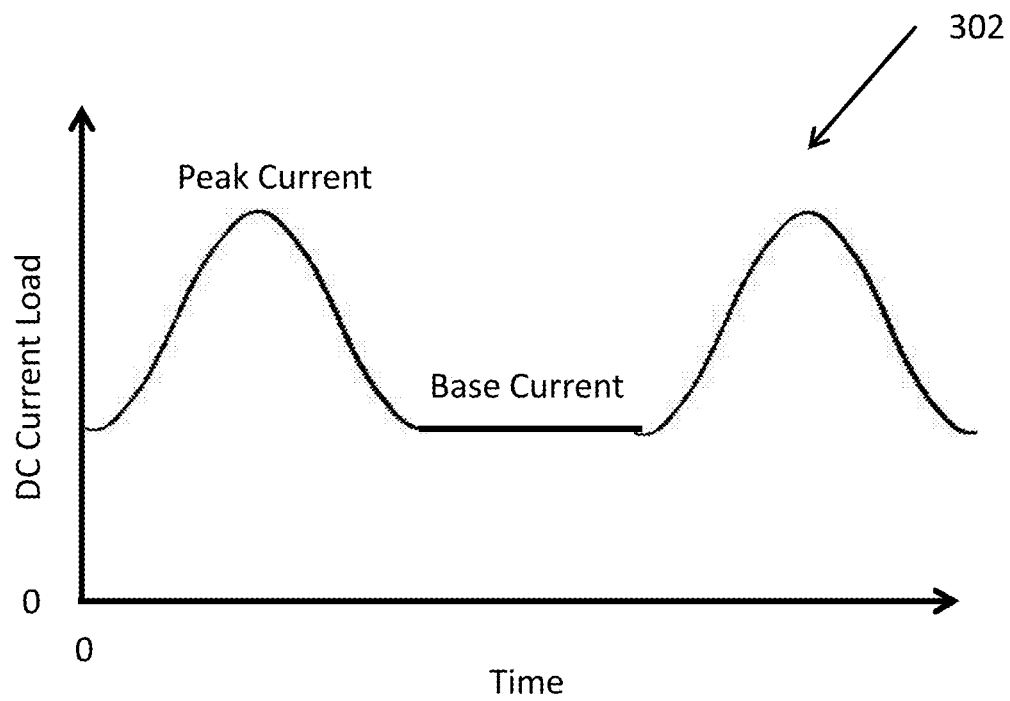
Figure 4C:
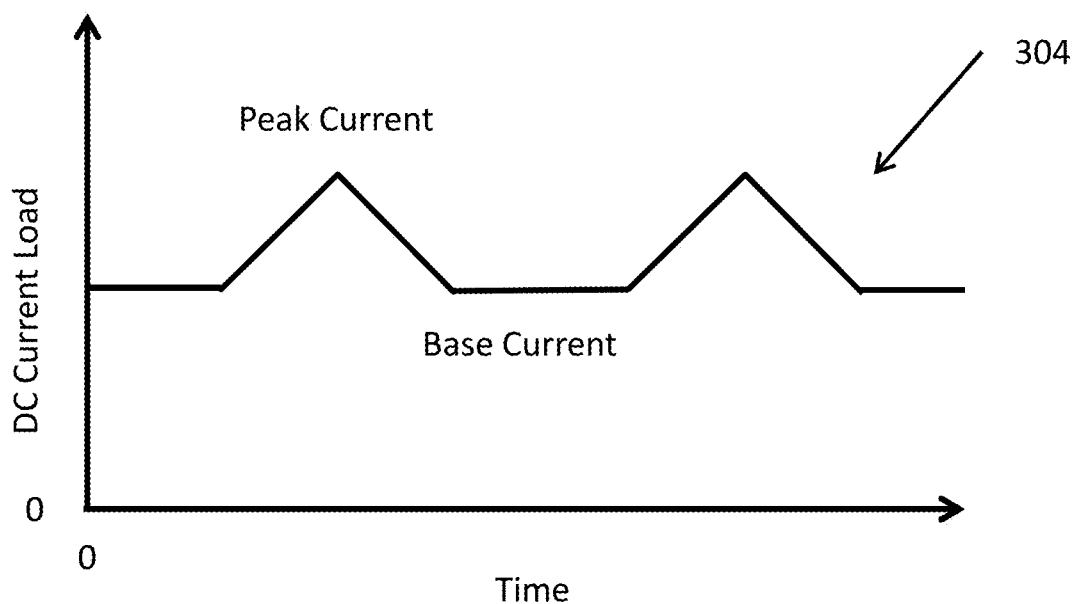
Figure 4D:
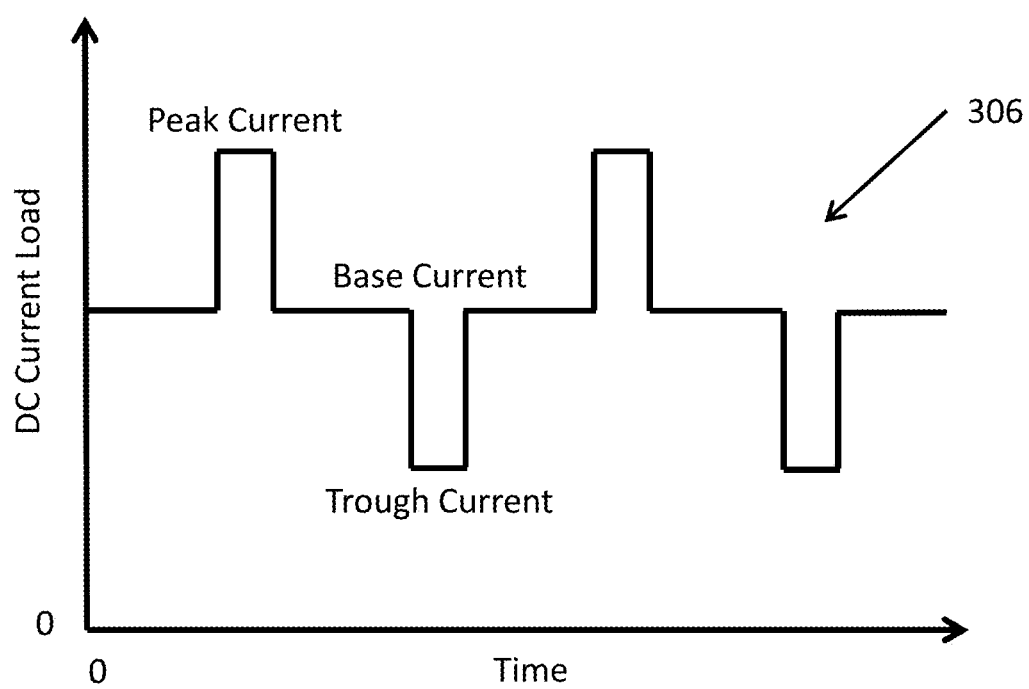

In some embodiments, the waveforms may be configured to maintain a consistent system power output as well as desorb contaminants. In particular, the waveforms may include positive and negative current pulses. For example, as shown in FIG. 4D, waveform 306 may include sequential positive and negative current pulses. During the negative current pulses, the DC current is reduced from the base current to a trough current. In various embodiments, the negative and positive current pulses may have the same absolute magnitude, with respect to the base current. The negative current pulses may be included to maintain a consistent system power output by counteracting positive pulses of other applied waveforms, as discussed below.

The absolute magnitude of the above current pulses may be from about 25% to about 200% greater than a corresponding base current, such as from about 50% to about 150%, or about 75% to about 100% greater than a corresponding base current.

In some embodiments, the base current may be the base current load of a SOFC stack and may range from about 25 amps (A) to about 50 A, such as from about 30 A to about 40 A, or about 35 A. The absolute magnitude of a current pulse, as measured from a corresponding base current a SOFC stack, may range from about 10 Å to about 100 A, such as from about 12 A to about 80 A, from about 14 A to about 75 A, from about 16 A to about 70 A, or from about 18 A to about 60 A. However, the absolute magnitude of a pulse may be determined according to the particular species to be desorbed and/or the electrical characteristics of a particular stack.

A pulse duty cycle of a pulse waveform may range from about 25% to about 75%, such as from about 30% to about 70%, from about 35% to about 65%, from about 40% to about 60%, from about 45% to about 55%, or about 50%.

A pulse frequency of a pulse waveform may range from about 50 Hertz (Hz) to about 2 mega Hertz (MHz), such as from about 75 Hz to about 1.5 MHz, or from about 100 Hz to about 1 MHz, for example.

A period over which the pulse waveform may vary according to the amplitude of the waveform pulses. For example, a higher amplitude pulse waveform may be applied for a shorter period, as compared to a lower amplitude pulse waveform. In some embodiments, a pulsed waveform may be applied for a period ranging from a number of seconds to about an hour, such as from about 10 seconds to about 1 hour, from about 15 seconds to about 30 minutes, from about 20 seconds to about 15 minutes, about 30 seconds to about 5 minutes, or from about 1 minute to about 2 minutes.

The controller 200 may be configured to selectively apply the pulsed load, such that total power output of the system 10 remains constant. For example, the pulse waveform may be applied to particular power modules 100, while an inverted pulse waveform is applied to an equal number of power modules 100. While this process will be described in terms of power modules 100, it may also be applied to fuel cell stacks 50 of a power module 100, or to fuel cells of a stack 50.

SOFC System Recovery Method

Figure 5:
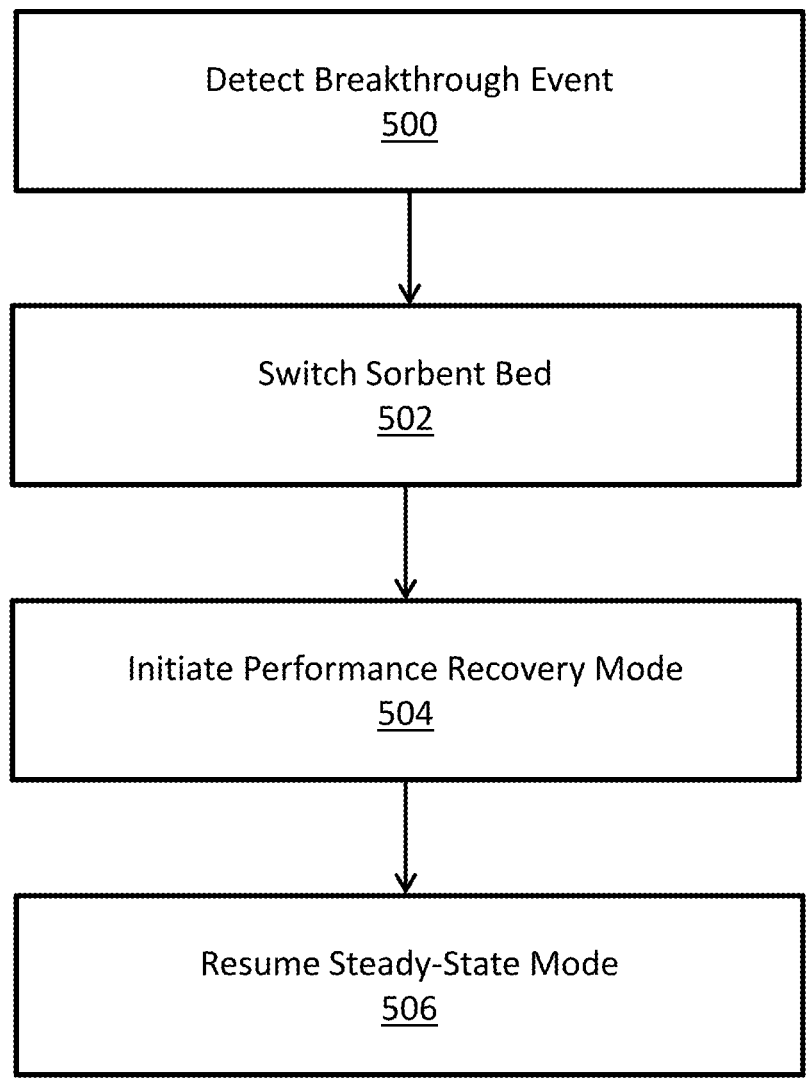
FIG. 5 is a block diagram illustrating a SOFC system performance recovery method, according to various embodiments of the present disclosure.
Figure 6A:
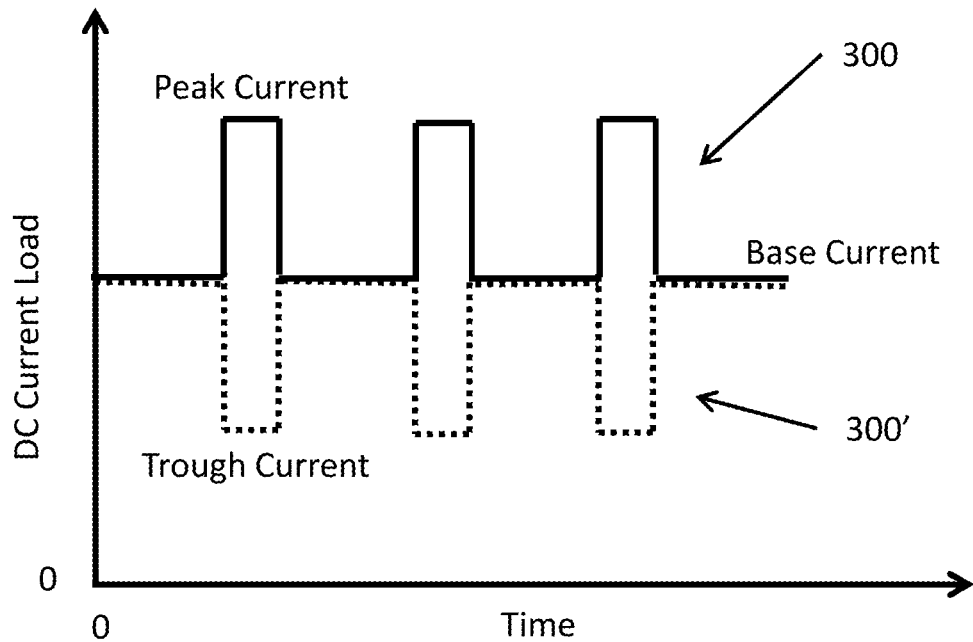
FIGS. 6A and 6B are graphs illustrating the concurrent application of pulse waveforms and inverse pulse waveforms to power modules, according to various embodiments of the present disclosure.
Figure 6B:
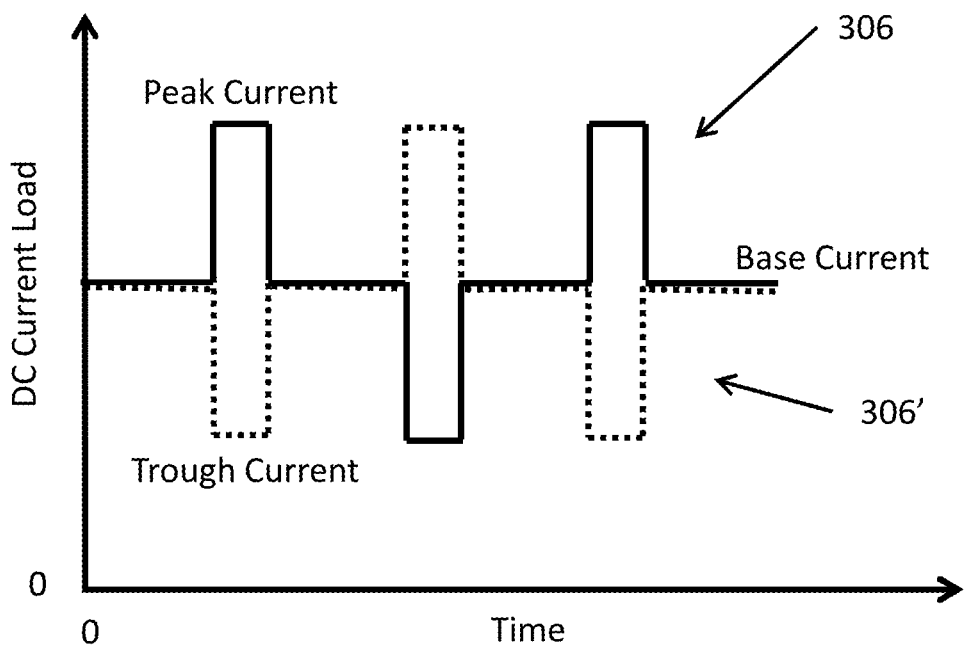

FIG. 5 is a block diagram illustrating a SOFC system performance recovery method, according to various embodiments of the present disclosure. FIG. 6A is a graph illustrating the concurrent application of waveform 300 and an inverse waveform 300' to different power modules 100, according to various embodiments of the present disclosure. FIG. 6B is a graph illustrating the concurrent application of waveform 306 and an inverse waveform 306' to different power modules 100, according to various embodiments of the present disclosure.

Referring to FIGS. 3 and 5, in step 500, the method may be performed using the fuel cell system 10, and may include detecting a breakthrough event during a steady-state mode of the fuel cell system 10. For example, the breakthrough even may be detected by the controller 200 using an unwanted constituent sensor or a stack voltage, as described above.

In step 502, the method may include switching between an exhausted sorbent bed to a fresh sorbent bed. For example, the system may be stopped and an exhausted sorbent bed may be replaced with a fresh sorbent bed. In the alternative, if the system includes a backup sorbent bed, the method may include rerouting fuel from the exhausted sorbent bed to the backup sorbent bed, without stopping fuel cell system operations.

In step 504, the method may include initiating a performance recovery mode of the fuel cell system 10. In particular, step 504 may include applying a DC current load pulse waveforms to fuel cells of the system. The waveform may be applied concurrently to all of the fuel cells of the system. However, in other embodiments, the waveform and an inverse of the waveform may be selectively applied, such that the power output of the system remains substantially constant during waveform application. In particular, the waveform and the inverse waveform may be applied on, a stack by stack basis, a stack column by stack column basis, or a power module by power module basis.

For example, the power modules 100 may be divided into first and second groups including equal numbers of the power modules 100. The controller 200 may be configured to apply the waveform to the first group of power modules 100 and may simultaneously apply an inverse waveform to the second group of power modules 100, using the corresponding load regulators 40.

For example, as shown in FIG. 6A, the controller 200 may apply waveform 300 to the first group of power modules 100 and may apply inverse waveform 300' to the second group of power modules 100. The waveforms 300, 300' may be applied for a recovery period sufficient to desorb contaminant species from the first group. The method may then include applying waveform 300' to the first group and applying waveform 300 to the second group for the recovery period.

In the alternative, as shown in FIG. 6B, the controller 200 may apply waveform 306 to the first group of power modules 100 and may apply inverse waveform 306' to the second group of power modules 100. The waveforms 300, 300' may be applied for a recovery period sufficient to desorb contaminant species from the first and second groups. Since waveforms 300 and 300' both include positive and negative pulses, contaminants may advantageously be desorbed from both of the first and second groups in a single step.

Waveforms 300', 306' may each be the respective inverse of waveforms 300, 306. In particular, waveform 300' may include negative current pulses where the base current is decreased to a trough current, instead of the positive current pulses included in waveform 300. The negative current pulses may have the same absolute magnitude as the positive current pulses, with respect to the base current.

Accordingly, pulses of waveforms applied to the first and second groups occur at substantially the same time, with one group receiving a positive pulse and the other group receiving a negative pulse. In other words, the positive and negative pulses of concurrently applied waveforms may offset one another. Therefore, the overall output of the power modules 100 of both groups may stay substantially the same. Accordingly, pulses of waveforms applied to the first and second groups occur at substantially the same time, with one group receiving positive pulse and the other group receiving a negative pulse. In other words, the positive and negative pulses of concurrently applied waveforms may offset one another. Therefore, the overall output of the power modules 100 of both groups may stay substantially the same.

In step 506, the method may include resuming the steady-state mode of fuel cell system operation. However, in some embodiments, fuel cell and/or fuel cell stack voltages may be measured to determine whether contaminants have been sufficient desorbed before resuming steady-state operations. If the contaminants have not been sufficiently desorbed, the waveforms may be reapplied applied before returning to steady-state operation.

Referring to FIGS. 3, 5A, and 5B, the power modules 100 may be divided into first and second groups including equal numbers of the power modules 100. The controller 200 may be configured to apply waveform 300 to the first group of power modules 100 and apply waveform 300' to the second group of power modules 100. In the alternative, the controller 200 may apply waveform 306 to the first group of power modules 100 and apply waveform 306' to the second group of power modules 100.

Pulses of the waveforms applied to the first and second groups occur at substantially the same time, with one group receiving positive pulse and the other group receiving a negative pulse. In other words, the positive and negative pulses of concurrently applied waveforms may offset one another. Therefore, the overall output of the power modules 100 of both groups may be substantially constant during application of the waveforms.

Thus, in some embodiments, a performance recovery method comprises applying a DC current load pulse waveform to one or more of the fuel cells for a recovery period sufficient to desorb a contaminant from the corresponding fuel cells.

In one embodiment, the DC current load pulse waveform is applied during sulfur poisoning. For example, the waveform may be applied periodically or after detection of contaminant breakthrough but before switching the exhausted adsorbent bed to a fresh bed when the system enters the performance recovery mode.

In another embodiment, the DC current load pulse waveform is applied during the performance recovery mode after sulfur poisoning is detected and the exhausted adsorbent bed is switched to a fresh bend.

In one embodiment, the DC current load pulse waveform is sufficient to desorb substantially all of the sulfur contaminant from the anodes of the solid oxide fuel cells in the fuel cell stacks. As used herein, "substantially all" means at least 90% by volume, such as 95 to 100%.

Accordingly, the present methods may allow for the restoration of fuel cell system performance within minutes or seconds, as compared to the hours or days conventionally required for the restoration of system performance. Further, the present methods may restore system performance without changing fuel or air flow rates.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A performance recovery method for a fuel cell system comprising fuel cells, the method comprising:
    operating the fuel cell system in a steady-state mode that comprises providing DC current generated by the fuel cells to an external load;
    detecting a sorbent bed contaminant breakthrough event during the operation of the fuel cell system in the steady-state mode;
    operating the fuel cell system in a performance recovery mode in response to the detection of the breakthrough event, the performance recovery mode comprising pulsing the DC current provided from the fuel cells to the external load for a recovery period to desorb contaminant from the corresponding fuel cells;
    wherein the performance recovery mode comprises:
        applying a first direct current (DC) load pulse waveform from a first group of the fuel cells to the external load; and
        concurrently applying a second DC load pulse waveform from a second group of the fuel cells to the external load, the second waveform being applied concurrently with the first waveform and being an inverse of the first waveform with respect to a base current of the fuel cells during the stead-state mode, and
    operating the fuel cell system in the steady-state mode.

2. The method of claim 1, wherein the detecting comprises detecting the contaminant in fuel provided to the fuel cells from the sorbent bed.

3. The method of claim 1, wherein the detecting comprises detecting a reduction in a voltage of the fuel cells.

4. The method of claim 1, wherein the pulsing comprises positive current pulses having a peak current that is from about 50% to about 150% greater than a base current of the fuel cells during the steady-state mode.

5. The method of claim 4, wherein the pulsing further comprises negative current pulses having a trough current that has a same absolute magnitude with respect to the base current as the positive current pulses.

6. The method of claim 1, wherein the pulsing comprises a current pulse duty cycle ranging from about 10% to about 50%.

7. The method of claim 1, wherein the pulsing comprises a pulse frequency ranging from about 50 Hertz (Hz) to about 2 mega Hertz (MHz).

8. The method of claim 1, wherein the first waveform comprises positive and negative pulses, with respect to the base current.

9. The method of claim 1, wherein the first and second groups of fuel cells comprise equal numbers of the fuel cells.

10. The method of claim 1, wherein the first and second groups of fuel cells are disposed in equal numbers of power modules of the fuel cell system.

11. The method of claim 1, wherein the recovery period ranges from about 30 seconds to about 5 minutes.

12. The method of claim 1, wherein the contaminant comprises a sulfur species or a combination of the sulfur species and one or more of carbon, silicon, and phosphorus species.

13. The method of claim 12, wherein the contaminant comprises the sulfur species.

14. The method of claim 1, wherein the method further comprises utilizing a fresh sorbent bed to remove contaminants from a fuel provided to the fuel cells, before initiating the performance recovery mode.

15. The method of claim 1, wherein the pulsing comprises rectangular, triangular, or sinusoidal-shaped current pulses.

16. The method of claim 1, wherein the performance recovery mode comprises desorbing substantially all of the contaminant from anodes of the corresponding fuel cells which comprise solid oxide fuel cells.

17. A performance recovery method for a fuel cell system comprising fuel cells, the method comprising:
    providing a DC current from the fuel cells to an external load in a steady-state mode; and
    pulsing the DC current provided from the fuel cells to the external load in a performance recovery mode for a recovery period to desorb a contaminant from the fuel cells; and
    wherein the performance recovery mode comprises:
        applying a first direct current (DC) load pulse waveform from a first group of the fuel cells to the external load; and
        concurrently applying a second DC load pulse waveform from a second group of the fuel cells to the external load, the second waveform being applied concurrently with the first waveform and being an inverse of the first waveform with respect to a base current of the fuel cells during the stead-state mode.

18. The method of claim 17, wherein:
    the fuel cells comprise solid oxide fuel cells located in fuel cell stacks;
    the contaminant comprises sulfur; and
    the pulsing the DC current desorbs substantially all of the sulfur contaminant from anodes of the solid oxide fuel cells in the fuel cell stacks.

19. The method of claim 17, wherein the pulsing the DC current is applied during the performance recovery mode after sulfur poisoning is detected.

20. The method of claim 17, wherein the pulsing the DC current provided from the fuel cells to the external load comprises pulsing the DC current provided from a fuel cell stack containing the fuel cells to the external load.

21. The method of claim 1, wherein the pulsing the DC current provided from the fuel cells to the external load comprises pulsing the DC current provided from a fuel cell stack containing the fuel cells to the external load.

22. A performance recovery method for a fuel cell system comprising fuel cells, the method comprising:
    providing the DC current from the fuel cells to an external load in a steady-state mode; and
    periodically desorbing a contaminant from the fuel cells in a performance recovery mode, the performance recovery mode comprising:
        applying a first direct current (DC) load pulse waveform from a first group of the fuel cells to the external load; and
        concurrently applying a second DC load pulse waveform from a second group of the fuel cells to the external load, the second waveform being an inverse of the first waveform with respect to a base current of the fuel cells during a steady-state mode.

\* \* \* \* \*